United States Patent
Inagaki et al.

(10) Patent No.: US 6,717,381 B2
(45) Date of Patent: Apr. 6, 2004

(54) CONTROL DEVICE FOR ELECTRIC-POWERED MOTOR AND DESIGNING METHOD THEREOF

(75) Inventors: Hiroyuki Inagaki, Aichi-ken (JP); Hideki Kuzuya, Aichi-ken (JP); Hiroaki Kato, Mie-ken (JP); Noboru Sebe, Fukuoka-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/197,404

(22) Filed: Jul. 18, 2002

(65) Prior Publication Data

US 2003/0052633 A1 Mar. 20, 2003

(30) Foreign Application Priority Data

Jul. 19, 2001 (JP) .......................................... 2001-219620

(51) Int. Cl.$^7$ ................................................ G05B 11/01
(52) U.S. Cl. ....................... 318/560; 318/567; 318/434; 318/432
(58) Field of Search ................................ 318/560, 567, 318/434, 432, 632, 649, 651, 677, 254, 138, 439, 376

(56) References Cited

U.S. PATENT DOCUMENTS

| | | | | |
|---|---|---|---|---|
| 5,004,965 A | * | 4/1991 | Otokawa et al. | 318/254 |
| 5,062,673 A | * | 11/1991 | Mimura | 294/111 |
| 5,576,957 A | * | 11/1996 | Asanuma et al. | 701/42 |
| 5,696,680 A | * | 12/1997 | Ichioka et al. | 701/67 |
| 6,107,761 A | * | 8/2000 | Seto et al. | 318/139 |
| 6,128,552 A | * | 10/2000 | Iwai et al. | 700/280 |
| 2002/0060545 A1 | | 5/2002 | Inagaki et al. | |
| 2002/0149332 A1 | | 10/2002 | Inagaki et al. | |

* cited by examiner

*Primary Examiner*—Karen Masih
(74) *Attorney, Agent, or Firm*—Sughrue Mion, PLLC

(57) ABSTRACT

A control device of an electric motor which can compatible high robust stability performance and a tracking performance and a designing method thereof. A feedback correction is obtained based on a detected motor rotation speed and a feedforward correction amount is obtained based on a calculated target torque by a controller of a microcomputer. The microcomputer commands torque control to an SR motor based on the feedback correction amount and the feedforward correction amount.

4 Claims, 13 Drawing Sheets

Fig.6
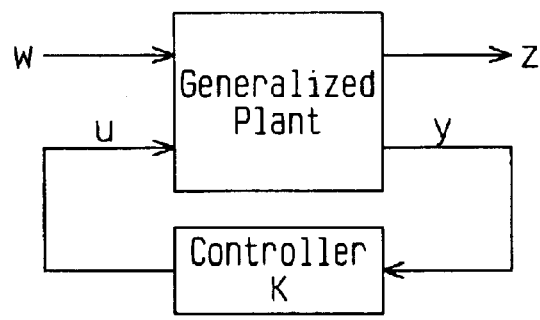
Fig.7
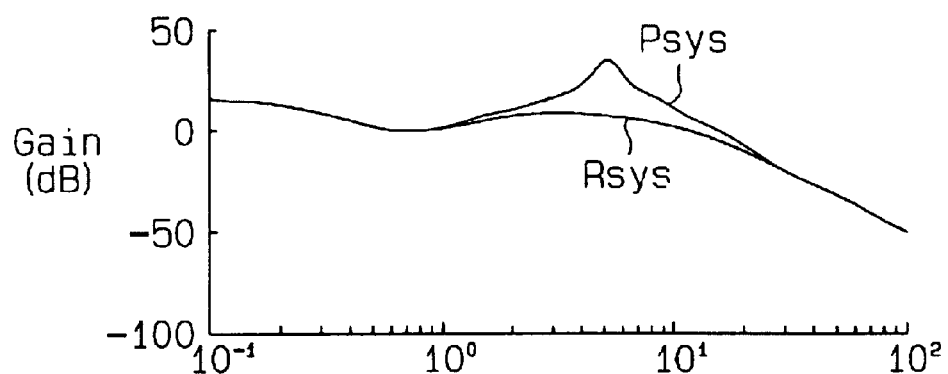
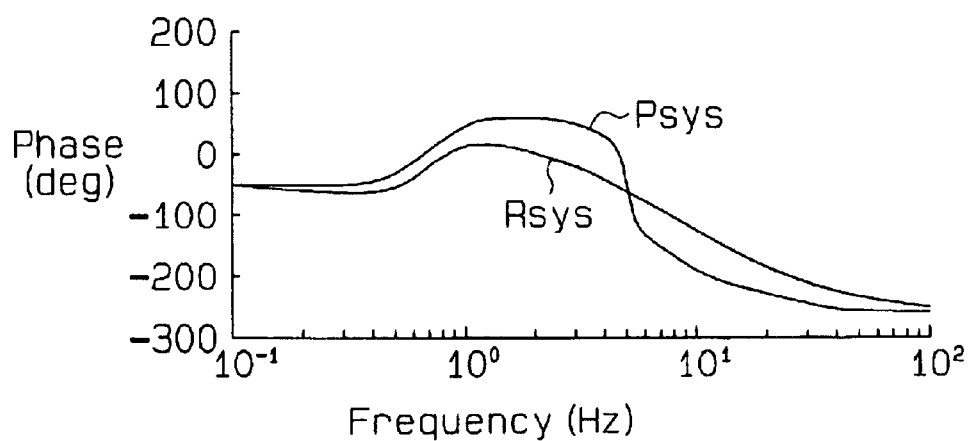

Two-Degree Of Freedom H∞ Control

CONTROL DEVICE FOR ELECTRIC-POWERED MOTOR AND DESIGNING METHOD THEREOF This application is based on and claims priority under 35 U.S.C. §119 with respect to filed on Jul. 19, 2001, the entire content of which is incorporated herein by reference.

FILED OF THE INVENTION

The present invention generally relates to an electric-powered motor. The present invention pertains to a control device for an electric-powered motor and a designing method thereof.

BACKGROUND OF THE INVENTION

SR motors (i.e., switched reluctance motor) have been known as traction motors for electric vehicles. According to general controls for the SR motors, a target torque Req_trq is calculated based on an operation amount of a throttle pedal (i.e., throttle opening degree) and the target torque Req_trq is converted into a command value to the SR motor using a predetermined map to be given to the SR motor. Thus, the SR motor is controlled for generating a torque in accordance with the target torque Req_trq.

A control system for the aforementioned SR motor is configured to have an open loop. When a vehicle applied with the foregoing SR motor includes the resonance characteristic due to the torsion of a shaft and tires and the influence of a suspension spring, the motor rotation speed is resonant relative to, for example, the sudden change of the target torque to cause the vibration in longitudinal direction of the vehicle. This vibration gives an annoyance to occupants.

In order to restrain the above-explained vibration, an SR motor controlled by applying H∞ control theory has been proposed.

FIG. 21 shows a detail of the control of an SR motor including a controller K (i.e., H∞ controller) designed using the H∞ control theory. That is, the target torque Req_trq is calculated based on the throttle opening degree in this control system, then the target torque Req_trq is converted into the command value to the SR motor by the predetermined map to be given to the SR motor. In this case, the target torque Req_trq is corrected by a feedback correction amount u calculated in the controller K based on the motor rotation speed Nm.

FIG. 22 is a time chart showing a response characteristic (i.e., motor rotation speed characteristic) when generating a stepped input by suddenly changing the target torque Req_trq by stepping on or releasing the throttle pedal during the control of the SR motor. That is, each motor rotation speed characteristic according to the open-loop control and the H∞ control relative to the sudden change of the target torque Req_trq is shown. As shown in FIG. 22, the vibration (i.e., resonance) of the motor rotation speed relative to the stepped input is restrained by performing the H∞ control compared to the case performing the open-loop control.

With the H∞ control problem mainly featuring the robust stability problem (i.e., securing the robust stability), when the performance requirement relative to the robust stability is extremely high, the performance of the tracking performance (i.e., vibration reduction and torque tracking performance) which has trade-off relationship with the robust stability is deteriorated. Thus, the high performance SR motor control in which high robust stability and the tracking performance are compatible is desired.

A need thus exists for a control device for an electric motor and a designing method thereof in which the high robust stability and the tracking performance are compatible with each other.

SUMMARY OF THE INVENTION

In light of the foregoing, the present invention provides a control device for an electric motor which includes an electric motor, a detection means for detecting a motor rotation speed of the electric motor, a calculation means for calculating a target torque of the electric motor, a feedback compensator for obtaining a feedback correction amount based on the detected motor rotation speed, a feedforward compensator for obtaining a feedforward correction amount based on the calculated target torque, and a control means for commanding a torque control to the electric motor based on the feedback correction amount and the feedforward correction amount.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 6 is a block view of a generalized plant of the H∞ control according to the embodiment of the present invention.

FIG. 7 is a graph showing each frequency characteristic of an physical model and a reference model according to the embodiment of the present invention.

DETAILED DESCRIPTION OF THE INVENTION

Figure 1:
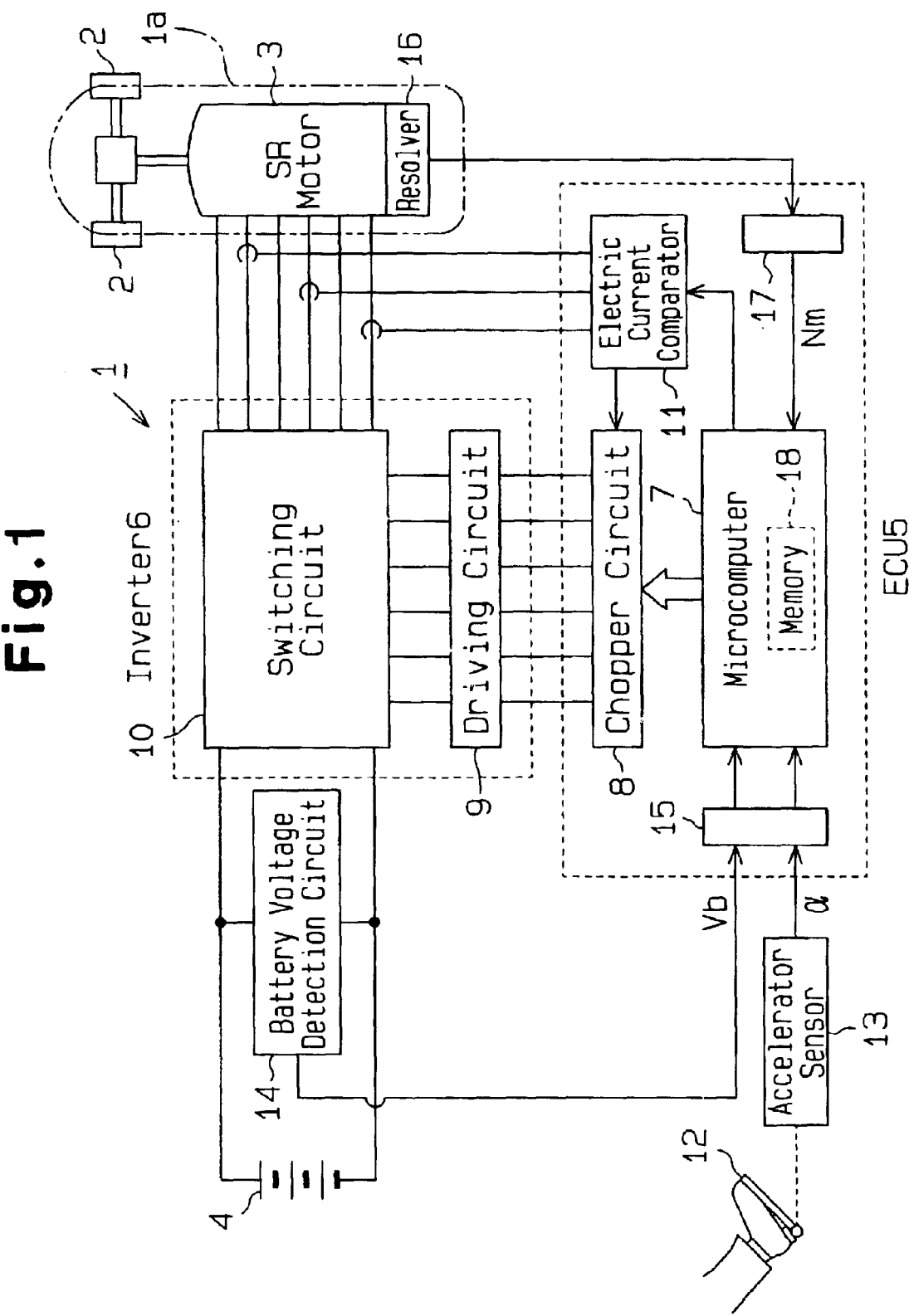
FIG. 1 is a schematic view of an electric vehicle according to an embodiment of the present invention.

An embodiment of a control device for an electric motor and a designing method thereof will be explained referring to FIGS. 1–20. As shown in FIG. 1, an electric vehicle 1 includes an SR motor (i.e., switched reluctance motor) 3 serving as an electric motor for outputting a driving torque to driving wheels 2. The SR motor 3 is installed on a predetermined portion in a parts room of the electric vehicle 1 to be assembled on a vehicle body 1a (i.e., the size of the vehicle body is not accurate in FIG. 1). Fuel cells and chargeable condenser are applied for serving as a battery 4. The SR motor 3 is controlled by an ECU (i.e., electronic control unit) 5 via an inverter 6. The ECU 5 includes a microcomputer 7 and a chopper circuit 8. The microcomputer 7 includes a calculation means, a controller, a feedback compensator, a feedforward compensator, and a control means.

The inverter 6 is connected to the battery 4 to be impressed with the battery electric voltage. An output side of the inverter 6 is electrically connected to the SR motor 3. The inverter 6 includes a driving circuit 9 and a switching circuit 10. A chopper circuit 8 is chopper controlled based on a command signal from the microcomputer 7 and the SR motor 3 is controlled based on the signal inputted from the chopper circuit 8 to the switching circuit 10 via the driving circuit 9.

The SR motor 3 corresponds to a three-phase motor, which is controlled by controlling the excitation timing of the three phase coils. The inverter 6 is connected to the SR motor 3 via electric power lines for supplying the excitation electric current to the three phase coils in the SR motor 3. Two electric power lines are connected to each coil, thus, six electric power lines in total are connected to the SR motor. An electric current comparator 11 detects the electric current value transmitted in the electric power lines. The chopper circuit 8 corrects the command value transmitted to the driving circuit 9 based on the electric detection signal inputted from the electric current comparator 11.

The microcomputer 7 is inputted with an acceleration signal (i.e., throttle opening degree α) inputted from an accelerator sensor 13 for detecting the operation amount of the throttle pedal 12 via an interface 15. The microcomputer 7 is also inputted with a battery electric voltage detection signal (i.e., battery electric voltage Vb) inputted from a battery voltage detection circuit 14 via the interface 15. The microcomputer 7 is further inputted with a rotation detection signal from a resolver 6 serving as a detection means for detecting the rotation condition of the SR motor 3 via an interface 17.

The microcomputer 7 memorizes a map M (shown in FIG. 3) in a memory 18 and obtains a target torque Req_trq referring to the map M based on the throttle opening degreeα detected by the accelerator sensor 13. The microcomputer 7 obtains the battery electric voltage Vb detected from the battery voltage detection circuit 14 and a motor rotation speed Nm based on the rotation detection signal from the revolver 16.

The microcomputer 7 obtains a command torque T by a controller K based on the target torque Req_trq and the motor rotation speed Nm. The command torque T corresponds to a command value for actually commanding for performing the control targeting the target torque Req_trq.

The memory 18 memorizes two maps (i.e., three-dimensional map; not shown) for separately obtaining a electric current command value I and an energization angle (i.e., angular command value) θ based on three parameters including the command torque T, the motor rotation speed Nm, and the battery electric voltage Vb. The microcomputer 7 commands the command signal including the electric current command value I and the angular command value θ determined by the three parameters (i.e., the command torque T, the motor rotation speed Nm, and the battery electric voltage Vb) to the chopper circuit 8. The chopper circuit 8 outputs a command signal, which is for sequentially energizing the excitation electric current in accordance with the electric current command value I at a predetermined excitation timing to the three phase coil in accordance with the angular command value θ, to the switching circuit 10 via the driving circuit 9.

Figure 2:
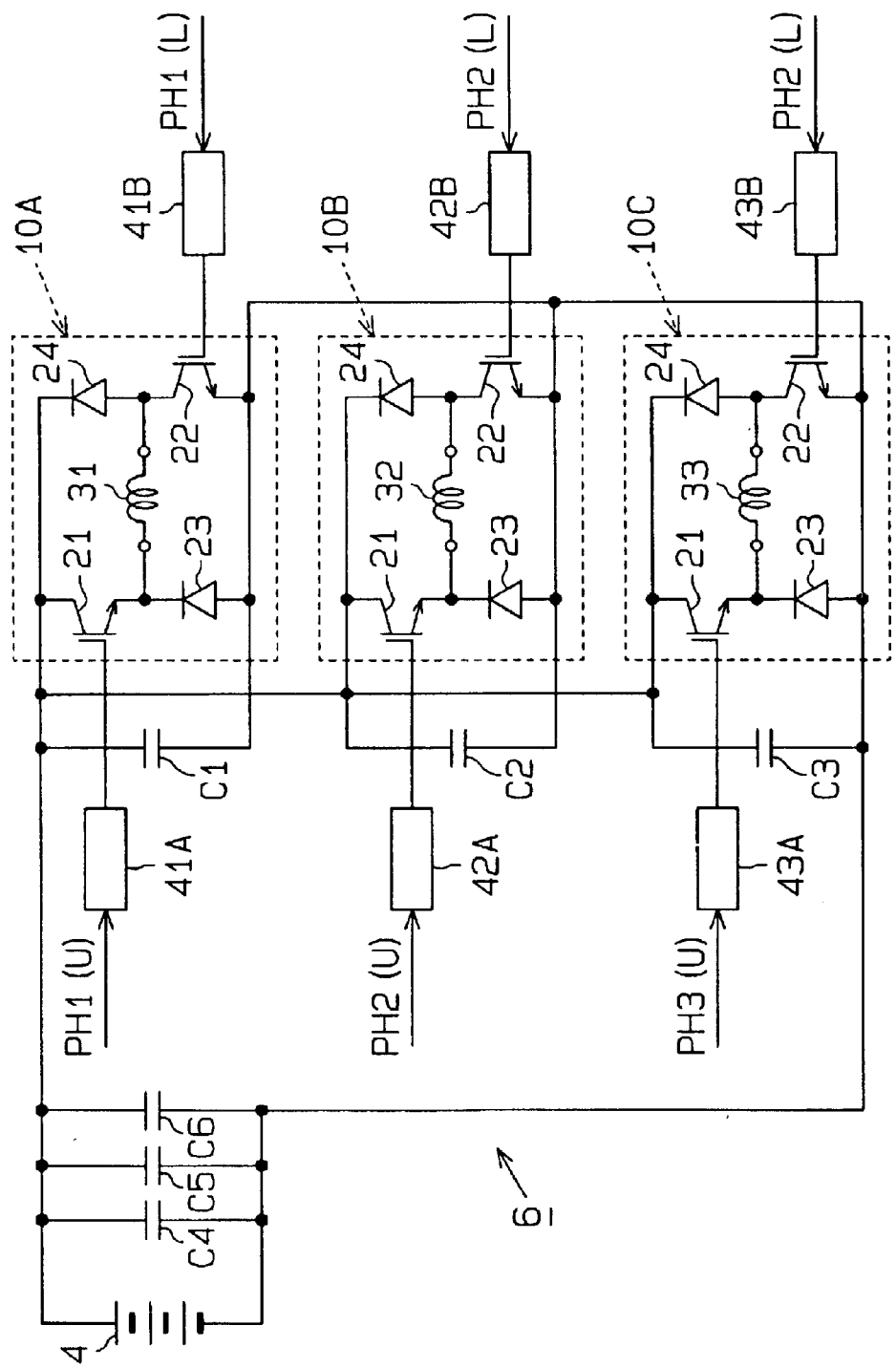
FIG. 2 is an electric circuit view of an inverter according to the embodiment of the present invention.
Figure 3:
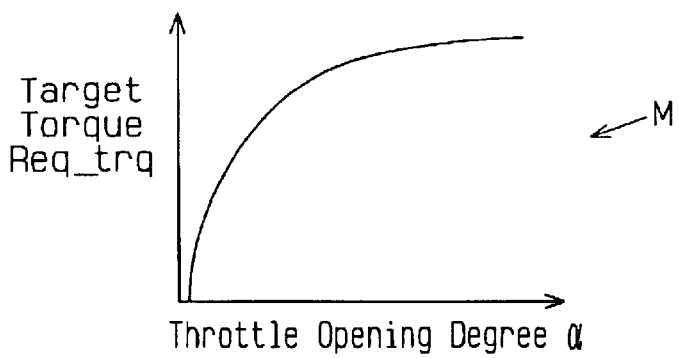
FIG. 3 is a map for obtaining a target torque from a throttle opening degree according to the embodiment of the present invention.

As shown in FIG. 2, the inverter 6 includes switching circuits 10A, 10B, 10C, each including one of three phases (i.e., phase 1, phase 2, phase 3) motor coils (i.e., three phase coil) 31, 32, 33. The switching circuit 10 is structured with three switching circuits 10A, 10B, 10C. The battery electric voltage from the battery 4 is impressed to each switching circuits 10A, 10B, 10C. Each switching circuit 10A, 10B, 10C includes two switching elements (i.e., transistor) 21, 22 and two diodes 23, 24 on both sides of the motor coils 31, 32, 33 respectively.

Driving circuits 41A, 41B are connected to a gate of the switching elements 21, 22 of the phase 1 for outputting the signal electric voltage. Driving circuits 42A, 42B are connected to a gate of the switching elements 21, 22 of the phase 2 for outputting the signal electric voltage. Driving circuits 43A, 43B are connected to a gate of the switching elements 21, 22 of the phase 3 for outputting the signal electric voltage. The driving circuit 9 is structured with driving circuits 41A, 41B, 42A, 42B, 43A, 43B, two of those are applied to respective switching circuits. Condensers C1, C2, C3 are connected to each switching circuit 10A, 10B, 10C in parallel and condensers C4, C5, C6 are connected to the battery 4 in parallel.

PWM signal of the duty value (%) in accordance with the electric current command value I generated in the chopper 8 is inputted into each gate of each switching element 21, 22 of three phases at the timing for sequently energizing the motor coils 31, 32, 33 of every phases at the excitation timing in accordance with the angular command value θ.

Thus, the excitation electric current in accordance with the electric current command value I is energized to each motor coil 31, 32, 34 at the excitation timing in accordance with the angular command value θ.

The command torque when the motor torque becomes zero torque by the inertia rotation of the SR motor 3 is uniquely determined in accordance with the motor rotation speed Nm. The memory 18 memorizes a map (not shown) for obtaining a reference torque $T_0$ corresponding to the command torque becoming zero torque (i.e., inertia rotation) from the motor rotation speed Nm. The microcomputer 7 detects the motor rotational direction based on the rotation detection signal from the resolver 16 and judges the case giving the torque which is in the same direction to the motor rotation direction as "the powering" and the case giving the torque reverse to the motor rotation direction as "the regeneration." In other words, when the current command torque T is equal to or greater than the reference torque $T_0$, it is judged as "the powering," and when the current command torque is less than the reference torque, it is judged as "the regeneration."

Under the regeneration condition, motor coils 31, 32, 33 of each phase are energized in order of the excitation timing for generating a reverse directional torque relative to the motor rotational direction obtained based on the rotation detection signal from the resolver 16 in order to control the SR motor 3 for generating the reverse torque. Under the powering condition, the motor coils 31, 32, 33 of each phase are energized in order of the excitation timing for generating the torque having an identical direction to the motor rotational direction obtained based on the rotation detection signal from the resolver 16 in order to control the SR motor for generating the normal torque. Thus, the torque in accordance with the command torque T is generated in the SR motor 3. The angular command value θ determines the foregoing excitation timing.

Figure 4:
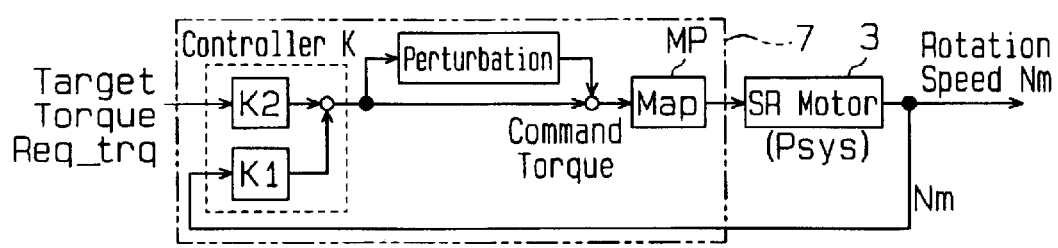
FIG. 4 is a block view showing a detail of motor control according to the embodiment of the present invention.

The designing of the controller K for obtaining the command torque T will be explained as follows. FIG. 4 shows a block view for showing a detail of the control of the SR motor. As shown in FIG. 4, the controller K for controlling (i.e., vibration restraining control) of the SR motor 3 serving as a controlled object includes a feedback compensator K1 and a feedforward compensator K2. That is, the control system of the SR motor 3 is structured as a control system with two-degree of freedom. The controller K (i.e., the feedback compensator K1 and the feedforawrd compensator K2) for independently ensuring the robust stability performance and the tracking performance regarding the control of the SR motor 3 is obtained. The SR motor 3 as the object to be controlled includes the characteristic variation such as the sensor noise and the differences of the vehicle type and the motor type. In other words, the controller K for controlling the SR motor 3 is designed considering the influence by the characteristic variation such as the differences of the vehicle type, the difference of the motor type, and the sensor noise.

A transfer function of the SR motor 3 is shown as a physical model Psys. The transfer function regarding the robust stability in FIG. 4 is shown as a formula 1 as follow.

$$\frac{K1 \cdot Psys}{1 + k1 \cdot Psys} \quad \text{[formula 1]}$$

On the other hand, a transfer function relating the tracking performance is shown as a formula 2 as follows.

$$\frac{K2 \cdot Psys}{1 + K1 \cdot Psys} \quad \text{[formula 2]}$$

Thus, because the feedforward compensator (i.e., transfer function) K2 is appeared only in the transfer function relating the tracking performance, the robust stability is not influenced by the change of the feedforward compensator K2. Accordingly, by individually setting the robust stability and the tracking performance during the control of the SR motor 3, the controller K is designed as a two-degree of freedom H∞ control problem based on the block figure shown in FIG. 5.

Generally, in the H∞ control problem the controller K is obtained so that a H∞ norm ($\|Tzw\|\infty$) relative to the transfer function Tzw from the exogenous input w to the control amount z becomes smaller than a predetermined value γ (e.g., 1) in the generalized plant having the exogenous input w (i.e., external input), the control input u, the control amount z, and an observation amount y. Hereinafter, the designing method of the controller K will be explained.

Determination of Physical Model

First, the physical model Psys is determined from the actual motor rotation speed Nm relative to a target torque w1 when the SR motor 3 is operated under the open loop system. That is, the target torque w1 is applied to the open loop system and the electric current command value I and the angular command value θ are determined by a predetermined map (i.e., map MP shown in FIG. 4). Then, the SR motor 3 is actually rotated via the shopper circuit 8, the driving circuit 9, and the switching circuit 10 based on the electric current command value I and the angular command value θ. The actual motor rotation speed Nm of the SR motor 3 relative to the target torque w1 is calculated and the physical model Psys is determined based on the calculated result (i.e., the actual response Nm relative to the target torque w1) (shown in FIG. 7). The determination of the physical model Psys is performed based on the identification examination and the method for the identification of the model parameter by the frequency fitting.

Derivation of Reference Model

A reference model Rsys, that is an ideal model in which the vibration reduction and the torque tracking performance relative to the change of the target torque w1 are compatible referring to the physical model Psys obtained by the foregoing manner is derived and composed. The reference model Rsys includes a gain having smaller gain than the physical model Psys by a predetermined amount around the resonance frequency and includes a gain corresponding to the gain of the physical model Psys within rest of the frequency region (shown in FIG. 7).

Figure 8:
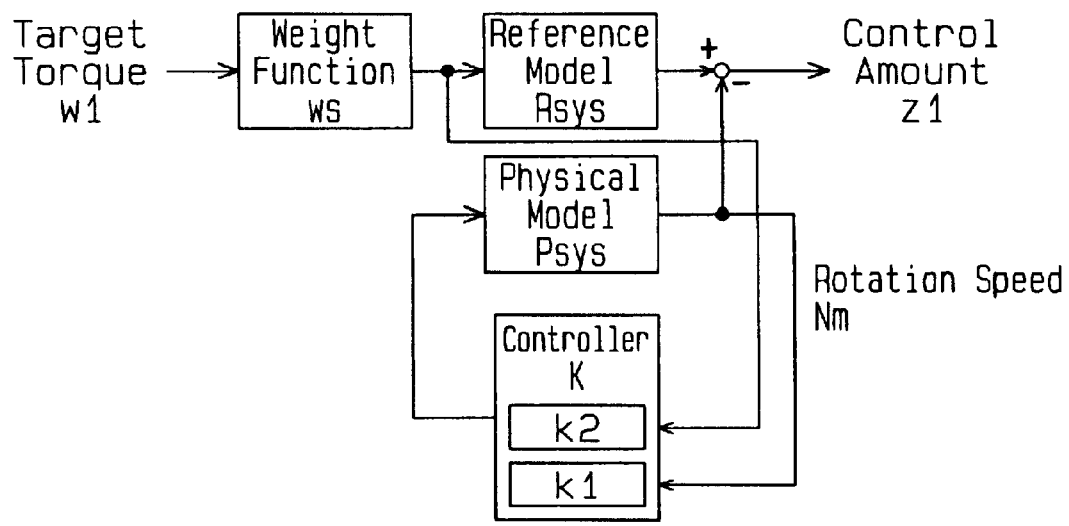
FIG. 8 is a block view showing a relationship between the physical model, the reference model, the controller and a weight function according to the embodiment of the present invention.

A system shown in FIG. 8 is structured using the controller K at a stage after the determination of the physical model Psys and the derivation of the reference model Rsys. That is, a closed loop is formed with the physical model Psys and the controller K (i.e., feedback compensator K1) and the target torque w1 considering the eight function ws is inputted into the controller K (i.e., feedforward compensator K2) and the reference model Rsys-respectively. A deviation between the output of the reference model Rsys and the output of the physical model Psys (i.e., difference between the motor rotation speeds) is outputted as a control amount z1.

Thus, the problem for obtaining the controller K for approximating the response of the physical model Psys to the response of the reference model Rsys can be result in the H∞ control problem for obtaining the controller K which reduces the H∞ norm relative to the transfer function Tz1w1 from the target torque w1 to the control amount z1 to be smaller than the predetermined value γ (i.e., ||Tz1w1||∞ ⊂ γ). Accordingly, the tracking performances (i.e., the vibration reduction and the torque tracking performance) of the controlled object can be simultaneously evaluated.

Figure 9:
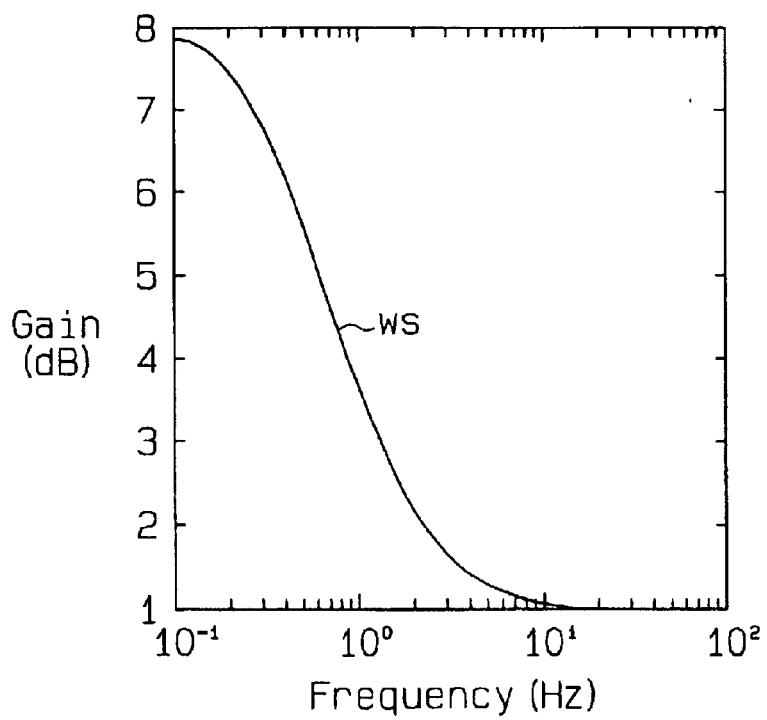
FIG. 9 is a graph showing a frequency characteristic of the weight function according to the embodiment of the present invention.

By setting the system so that the weight function ws has larger value within a specific frequency region, the controller K can further approximate the actual response within the specific frequency region to the response of the reference mode Rsys. As shown in FIG. 9, according to this embodiment, the gain of the weight function ws is predetermined to be larger within a low frequency region and the vibration reduction and the torque tracking performance of the SR motor 3 are improved by approximating the actual response within the low frequency region to the reference model.

Method for Derivation of Characteristic Variation/Setting of Weight Function

Figure 10:
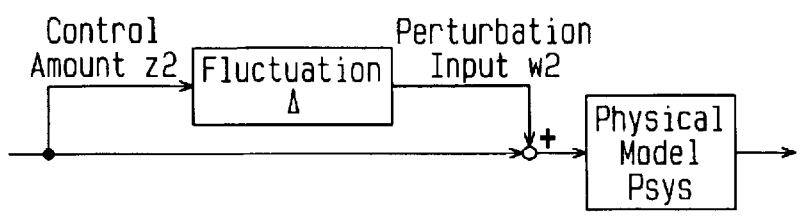
FIG. 10 is a block view showing a characteristic variation according to the embodiment of the present invention.

It was proved that the transfer characteristic from the target torque w1 to the motor rotation speed Nm is fluctuated due to the differences in the driving condition and the differences of the vehicle type and the motor type by the experiment. In addition, it was proved that the torque ripple is generated when switching the energization to influence the motor rotation speed Nm when performing the energization switching to each motor coil 31, 21, 33 of the SR motor 3 under the high frequency. As shown in FIG. 10, the characteristic variation of the controlled object due to the driving condition, the difference of the vehicle type, the difference of the motors, and the torque ripple is treated as a multiplicative fluctuation Δ. In this case, an input to the multiplicative fluctuation Δ is recognized as a control amount z2 and an output from the multiplicative fluctuation Δ is recognized as a perturbation input w2 (i.e., input to the generalized plant) to result in a problem for obtaining the controller K in which the influence of the perturbation input w2 is unlikely shown in the control amount z2.

Figure 11:
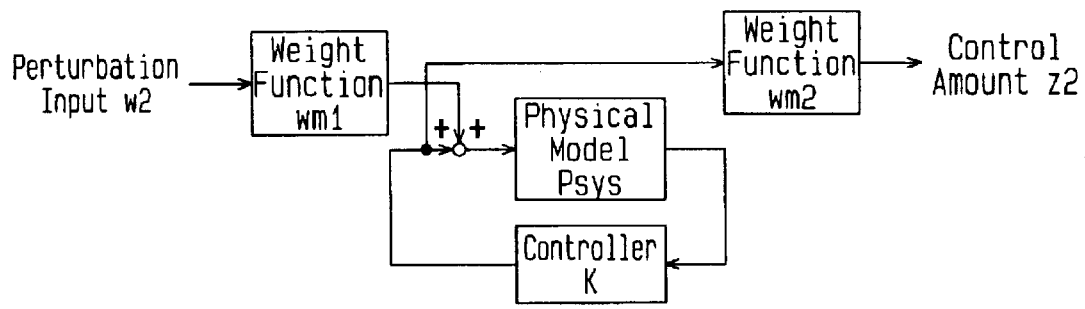
FIG. 11 is a block view showing a detail of the characteristic variation according to the embodiment of the present invention.
Figure 12:
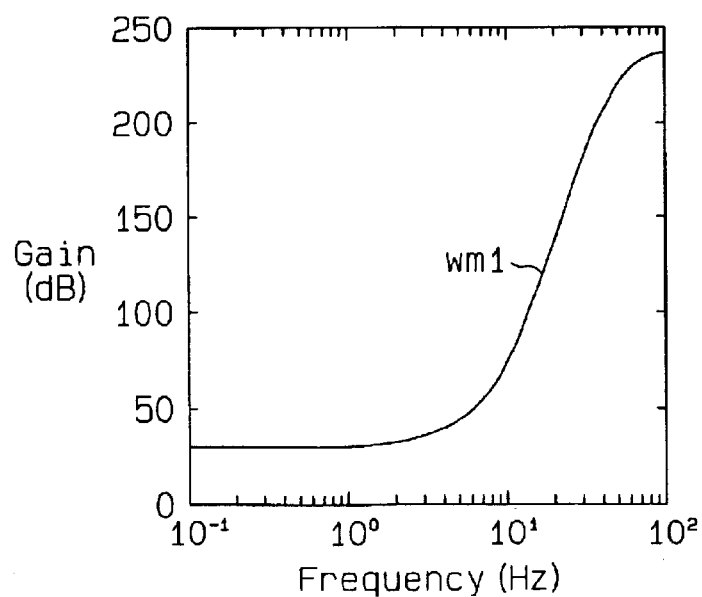
FIG. 12 is a graph showing the frequency characteristic of the weight function according to the embodiment of the present invention.
Figure 13:
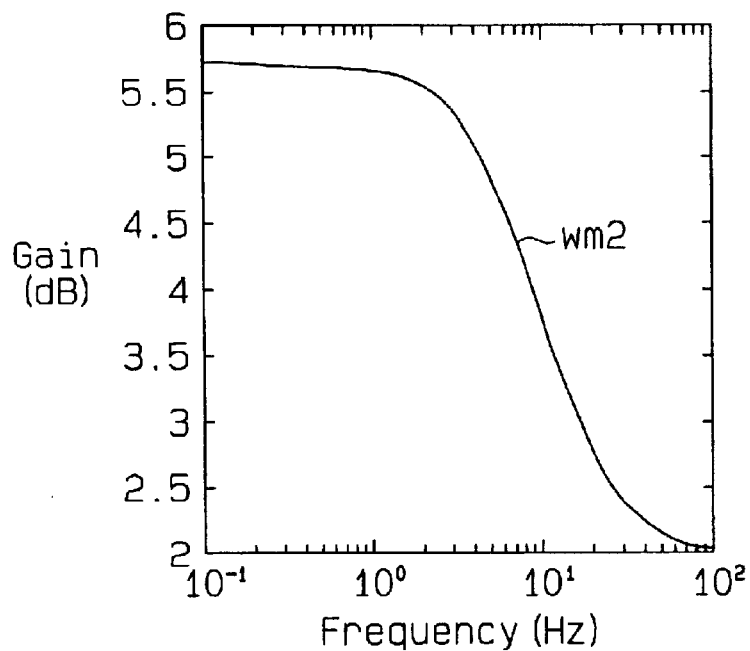
FIG. 13 is a graph showing the frequency characteristic of the weight function according to the embodiment of the present invention.

In more concrete terms, as shown in FIG. 11, by adding the perturbation input w2 to the command torque via a weight function wm1, the aforementioned torque ripple is treated as a disturbance torque relative to the command torque. In other words, the frequency characteristic for the torque ripple is represented with the weight function wm1. As shown in FIG. 12, the weight function wm1 is set to have a larger gain within the high frequency region relative to the resonance point. The system is constructed to obtain the control amount z2 by indicating the variation of the transfer characteristic depending on the driving condition and due to the differences of the vehicle type and the motor type with the weight function wm2. The weight function wm2 is set to have a large gain within the low frequency side region as shown in FIG. 13. With the foregoing manner, the problem for obtaining the controller K for restraining the influence of the characteristic variation due to the driving condition, the difference of the vehicle type, the difference of the motor type, and the torque ripple can be resulted in the H∞ control problem.

Derivation of Noise Characteristic/Setting of Weight Function

Figure 14:
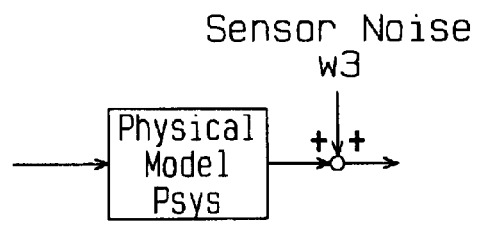
FIG. 14 is a block view showing a sensor noise according to the embodiment of the present invention.

The motor rotation speed Nm which corresponds to the detection amount used for the control includes a sensor noise (i.e., white noise) of the resolver 16. The influence of the sensor noise to the system is as shown in FIG. 14.

Figure 15:
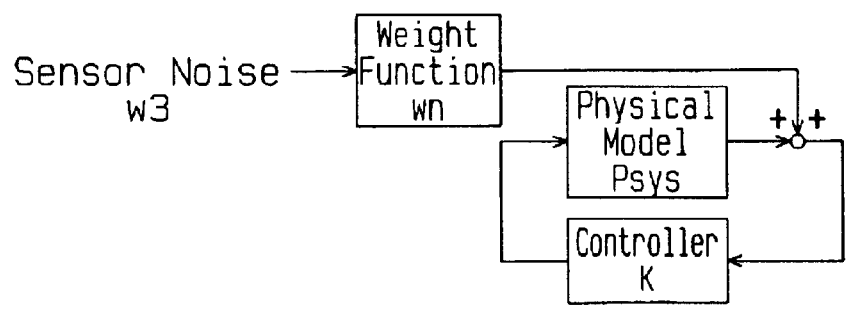
FIG. 15 is a block view showing a detail of the sensor noise according to the embodiment of the present invention.
Figure 16:
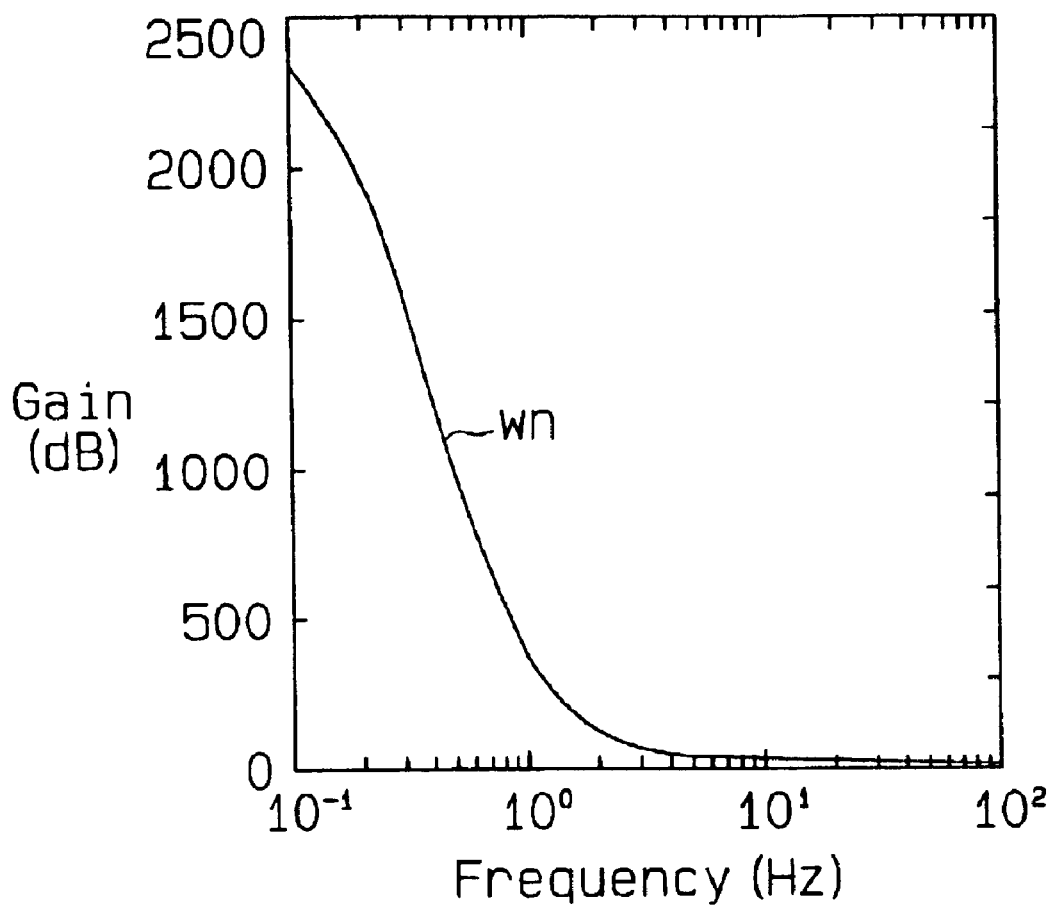
FIG. 16 is a graph showing the frequency characteristic of the weight function according to the embodiment of the present invention.

The motor rotation speed Nm maintains a constant value without becoming zero immediately after the decline of a generated torque to be zero because the motor rotation speed Nm corresponds to an integrated value of the generated torque of the SR motor 3 before a predetermined time in advance. This constant value is determined as a steady-state element of the motor rotation speed. On the other hand, the physical model Psys is linearly designed around the resonance point. Thus, it is necessary to remove the steady-state element of the motor rotation speed to improve the performance. In order to remove the steady-state element of the motor rotation speed and the sensor noise, the steady-state element of the motor rotation speed is represented with a weight function wn relative to a sensor noise w3 to be inputted into between the physical model Psys and the controller K (i.e., feedback compensator K1) via the weight function wn as shown in FIG. 15. According to this embodiment, it is set that a gain of the weight function wn is increased within the low frequency region, as shown in FIG. 16, to appropriately remove the steady-state element of the motor rotation speed which influences the motor rotation speed more than the sensor noise.

Calculation of Controller K

Figure 5:
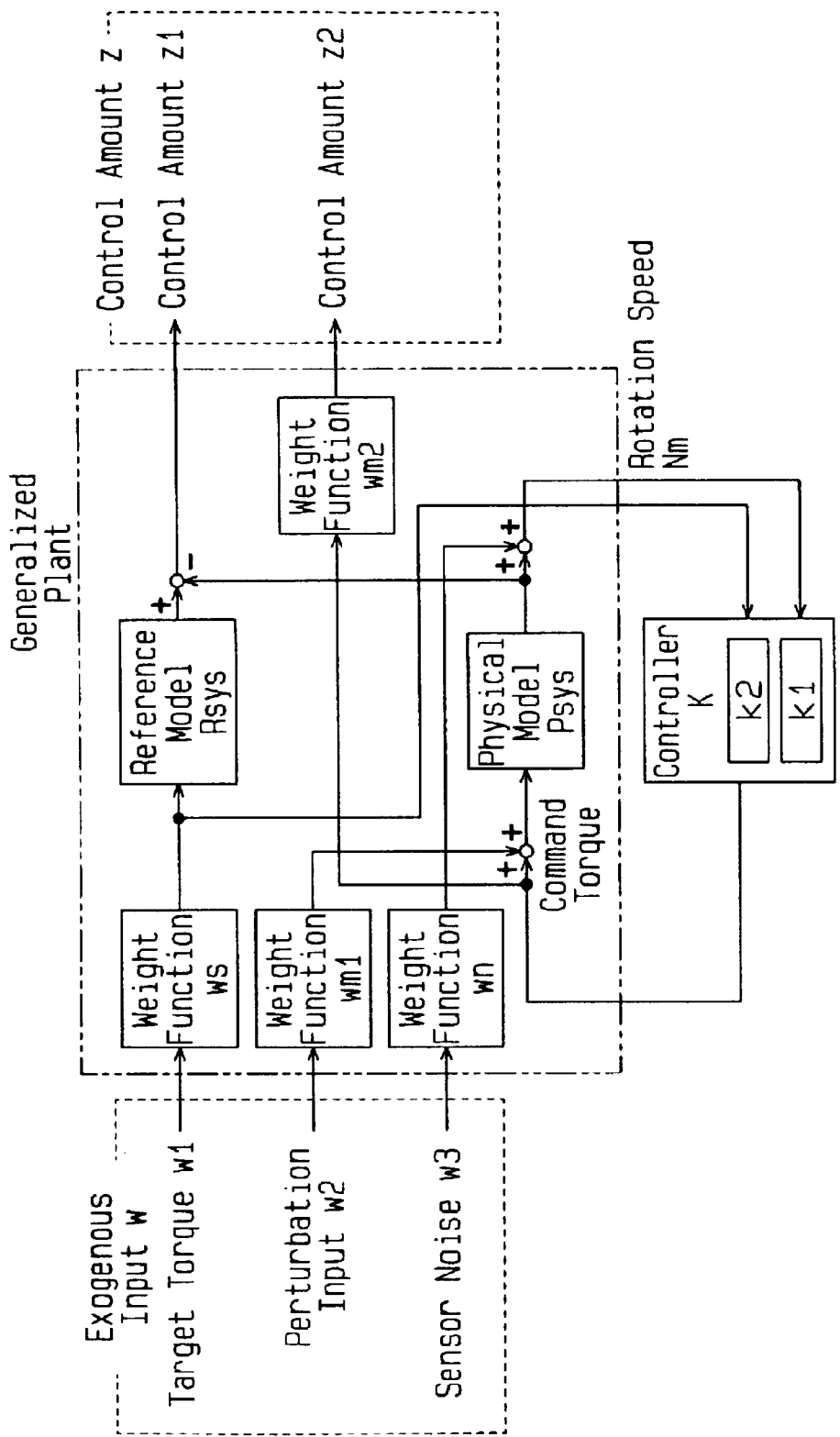
FIG. 5 is a block view for determining a controller by H∞ control according to the embodiment of the present invention.

The control system is represented with the generalized plant according to the two-degree of freedom H∞ control shown in FIG. 5 by the relationship between an exogenous input w (i.e., the target torque w1, the perturbation input w2, and the sensor noise w3) predetermined in the foregoing manner and the control amount z (i.e., control amounts z1, z2). As explained above, according to the H∞ control problem, the controller K having the H∞ norm (||Tzw||∞) relative to the transfer function Tzw from the exogenous input w to the control amount z smaller than the predetermined value γ (e.g., 1) is obtained.

For evaluating the H∞ norm (||Tzw||∞) relative to the transfer function Tzw, each H∞ norm including the transfer function Tz1w1 from the target torque w1 to the control amount z1, a transfer function Tz2w2 from the perturbation input w2 to the control amount z2, and a transfer function Tz2w3 from the sensor noise w3 to the control amount z2 is evaluated.

The transfer function Tz2w2 from the perturbation input w2 to the control amount z2 is represented as shown in a formula 3.

$$T_{z2w2} = \frac{Psys \cdot K1 \cdot wm1 \cdot wm2}{1 + Psys \cdot K1} \quad [\text{Formula 3}]$$

Accordingly, the controller K (i.e., feedback compensator K1) is obtained as shown in a formula 4 so that the H∞ norm relative to the transfer function Tz2w2 becomes smaller than a value 1.

$$\left\| \frac{Psys \cdot K1 \cdot wm1 \cdot wm2}{1 + Psys \cdot K1} \right\|_\infty \subset 1 \quad [\text{Formula 4}]$$

Thus, the robust stability relative to the multiplicative fluctuation (i.e., the characteristic variation due to the difference of the driving condition, and the difference of the vehicle type, the difference of the motor type, and the torque ripple) is considered (i.e., a first robust stability condition).

The transfer function Tz2w3 from the sensor noise w3 to the control amount z2 is represented as shown in a formula

5.

$$Tz2w3 = \frac{K1 \cdot wn \cdot wm2}{1 + Psys \cdot K1} \qquad \text{[Formula 5]}$$

Accordingly, the controller K (i.e., feedback compensator K1) is obtained as shown in a formula 6 so that the H∞ norm relative to the transfer function Tz2w3 becomes smaller than a value 1.

$$\left\| \frac{K1 \cdot wn \cdot wm2}{1 + Psys \cdot K1} \right\|_\infty \subset 1 \qquad \text{[Formula 6]}$$

Thus, the robust stability relative to the characteristic variation due to the sensor noise and the steady-state element of the motor rotation speed is considered (i.e., a second robust stability condition).

As explained above, the robust stability of the object to be controlled is not influenced by the feedforward compensator K2 (i.e., referred to the formula 1) and the element of the feedforward compensator K2 is not included in the first and the second robust stability conditions (i.e., shown as the formulas 4, 6)

On the other hand, the transfer function Tz1w1 from the target torque w1 to the control amount z1 is represented with a formula 7 as follows.

$$Tz1w1 = ws \cdot \left( Rsys - \frac{K2 \cdot Psys}{1 + K1 \cdot Psys} \right)$$

Accordingly, the controller K (i.e., feedback compensator K2) is obtained as shown in a formula 8 so that the H∞ norm relative to the transfer function Tz1w1 becomes smaller than a predetermined value γ.

$$\left\| ws \cdot \left( Rsys - \frac{K2 \cdot Psys}{1 + K1 \cdot Psys} \right) \right\|_\infty \subset \gamma \qquad \text{[Formula 8]}$$

That is, the physical model Psys is approximated to the reference model Rsys so that the predetermined value γ becomes approximately the minimum value. Thus, the tracking performance (i.e., the vibration reduction and the torque tracking performance) of the object to be controlled (i.e., SR motor 3) is considered.

In the forgoing manner, the controller K (i.e., feedback compensator K1) obtained considering mainly the first and the second robust stability condition (i.e., shown as the formula 4 and the formula 6) and the controller K (i.e., feed forward compensator K2) for approximating the physical model Psys to the reference model Rsys while maintaining the tracking performance of the object to be controlled are simultaneously obtained. Thus, the controller K for simultaneously satisfying the robust stability and the tracking performance for the control of the SR motor 3 is obtianed.

There are two approaches for solving the H∞ control problem: an approach for solving Riccatti's equation and an approach for solving LMI problem which corresponds to inequity version of the Riccatti's equation. Either one of those approaches can be applied for solving the H∞ control problem. According to this embodiment, a controller K (s) is derived applying the approach based on the LMI. Although the approach based on the LMI requires more calculation for solving large programs than problems based on Riccatti's, the approach based on the LMI can remove the normality constrain included in the approach based on the LMI. That is, the LMI based approach includes a characteristic applicable to arbitrary plant.

The controller K (s) is derived using a CAD "MATLAB" for designing control system. By performing the setting of the weight function and the reference model Rsys relative to the generalized plant constructed in the foregoing manner, correcting the setting of the weight function and the reference model Rsys several times during the designing cycle to satisfy the design specification, and the designing is completed when the design specification is satisfied.

In the foregoing manner, a required specification of the SR motor 3 is represented with the generalized plant of the H∞ control problem to obtain the optimum solution as the two-degree of freedom H∞ control problem. Thus, the control (i.e., vibration restraining control) of the SR motor 3 in which the compatibility of high robust stability and the tracking performance can be achieved.

Model Reduction of Controller

Next, a model reduction transaction of the designed controller K (s) (i.e., feedback compensator K1, feedforward compensator K2) is performed. In case that the control is carried out by mounting the controller in the microcomputer 7, large degree of the controller increases the calculation load of the microcomputer 7 too much to perform the calculation by a predetermined sampling cycle. The method for declining the degree of the controller K (s) without changing the characteristics of the controller is called the model reduction. The controller with high degree can be performed with the model reduction without changing the frequency characteristic thereof. According to this embodiment, the controller corresponds to the controller K (s) of $28^{th}$ term and the controller K (s) of $28^{th}$ term is performed with the model reduction to the $13^{th}$ term without changing the frequency characteristic thereof.

Discreteness

Then, by performing the discreteness of each feedback compensator K1 performed with the model reduction and feedforward compensator K2 performed with the model reduction in accordance with degree of term n following the sampling time of the microcomputer, a feedback correction amount u1 (k) and a feedforward correction amount u2 can be obtained as shown in formulas 9 as follows.

$$u1(k) = \sum_{i=1}^{n} ai \cdot u1(k-1) + \sum_{i=0}^{n} bi \cdot Nm(k-i) \qquad \text{[Formula 9]}$$

$$u2(k) = \sum_{i=1}^{n} ci \cdot u2(k-1) + \sum_{i=0}^{n} di \cdot \text{Req\_trq}(k-i)$$

Coefficients ai, bi correspond to coefficients accompanied with the discreteness of the feedback compensator K1 performed with the model reduction. Coefficients ci, di correspond to coefficients accompanied with the discreteness of the feedforward compensator K2 performed with the model reduction. In this case, the correction amounts u1(k), u2(k), a motor motor rotation speed Nm (k), and a target torque Req_trq (k) represent the correction amounts u1, u2 obtained in the current calculation, the motor motor rotation speed Nm during the current calculation, and the target torque Req_trq during the current calculation respectively. Correction amounts u1(k−i), u2(k−i), a motor motor rotation speed Nm (k−i), and a target torque Req_trq (k−i) represent the correction amounts u1, u2 obtained in the calculation of i times before, the motor motor rotation speed Nm during the calculation i times before, and the target torque Req_trq during the calculation i times before. Because the control device of the electric motor according to this embodiment is performed with the model reduction to the $13^{th}$ term, the current correction amounts u1(k), u2(k) are calculated based on the motor motor rotation speed Nm and the target torque Req_trq up to the 13 terms before (i.e., n=13). The controller K calculates the command torque T by adding the correction amounts u1(k), u2(k).

Figure 17:
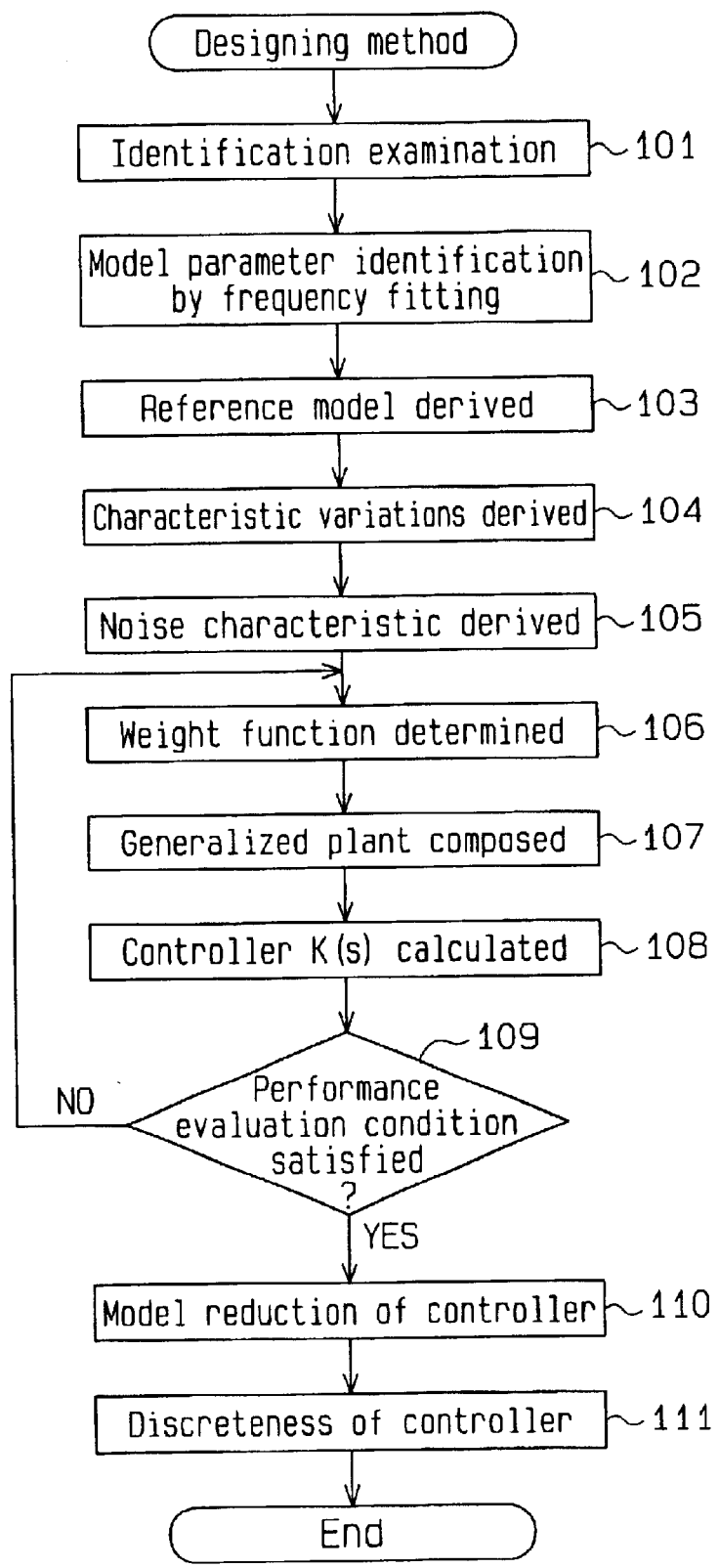
FIG. 17 is a flowchart showing a procedure of a designing method according to the embodiment of the present invention.

FIG. 17 is a flowchart showing the designing order for obtaining the aforementioned controller K. In Step 101, the identification examination for obtaining the physical model Psys is performed. The identification of the model parameter by the frequency fitting is performed to obtain the physical model Psys in Step 102. In Step 103, the reference model Rsys is derived. What characteristic are included in the characteristic variation such as the driving condition, the differences in the vehicle type and the torque ripple is examined in Step 104. And in Step 105, it is examined what characteristic is included in the sensor noise.

In Step 106, the weight functions ws, wm1, wm2, wn are predetermined based on the characteristic variation and the noise characteristic examined in the foregoing manner. The generalized plant, shown in FIG. 5, is created in Step 107. In Step 108, the controller K (s) (i.e., feedback compensator K1 and the feedforward compensator K2) is calculated by the MATLAB. Then, it is judged whether the performance evaluation condition is satisfied in Step 109.

In case the performance evaluation condition has not satisfied at this stage, the Steps 106–108 are repeated until the performance evaluation condition is satisfied. In case it is judged that the performance evaluation condition is satisfied in Step 109, the controller K(s) is performed with the model reduction in Step 110. The discreteness of the controller K performed with the model reduction is performed in Step 111.

Figure 18:
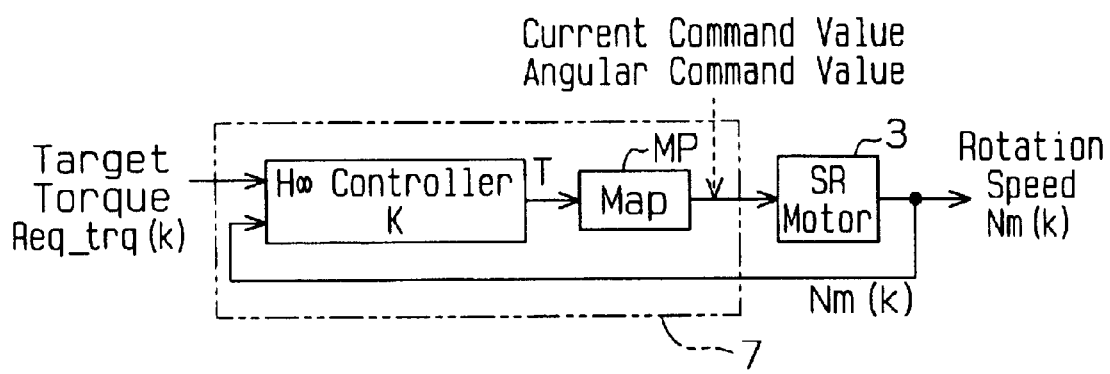
FIG. 18 is a block view showing the detail of motor control according to the embodiment of the present invention.

FIG. 18 shows a block view when the controller K performed with the model reduction (i.e., H∞ controller) is mounted in the microcomputer 7. That is, the microcomputer 7 inputs the motor motor rotation speed Nm (k) from the resolver 16 and obtains the feedback correction amount u1(k) by the controller K (i.e., feedback compensator K1) following the formula 9. On the other hand, the microcomputer 7 inputs the throttle opening degree a from the accelerator sensor 13 to convert the throttle opening degree a into the target torque Req_trq (k) by the map M (i.e., target torque map) shown in FIG. 3. The microcomputer 7 obtains the feedforward correction amount u2 (k) by the controller K (i.e., feedforward compensator K2) following the formula 9.

The microcomputer 7 calculates the command torque T by adding the correction amounts u1(k) and u2(k). Then, the microcomputer 7 converts the command torque T to the electric current command value I and the angular command value θ by the map M to give to the SR motor 3.

The control of the block view shown in FIG. 18 is realized on a software. Thus, according to this embodiment, the controller K (i.e., feedback compensator K1 and the feedforward compensator K2) corresponds to a digital filter realized on the software.

Figure 19:
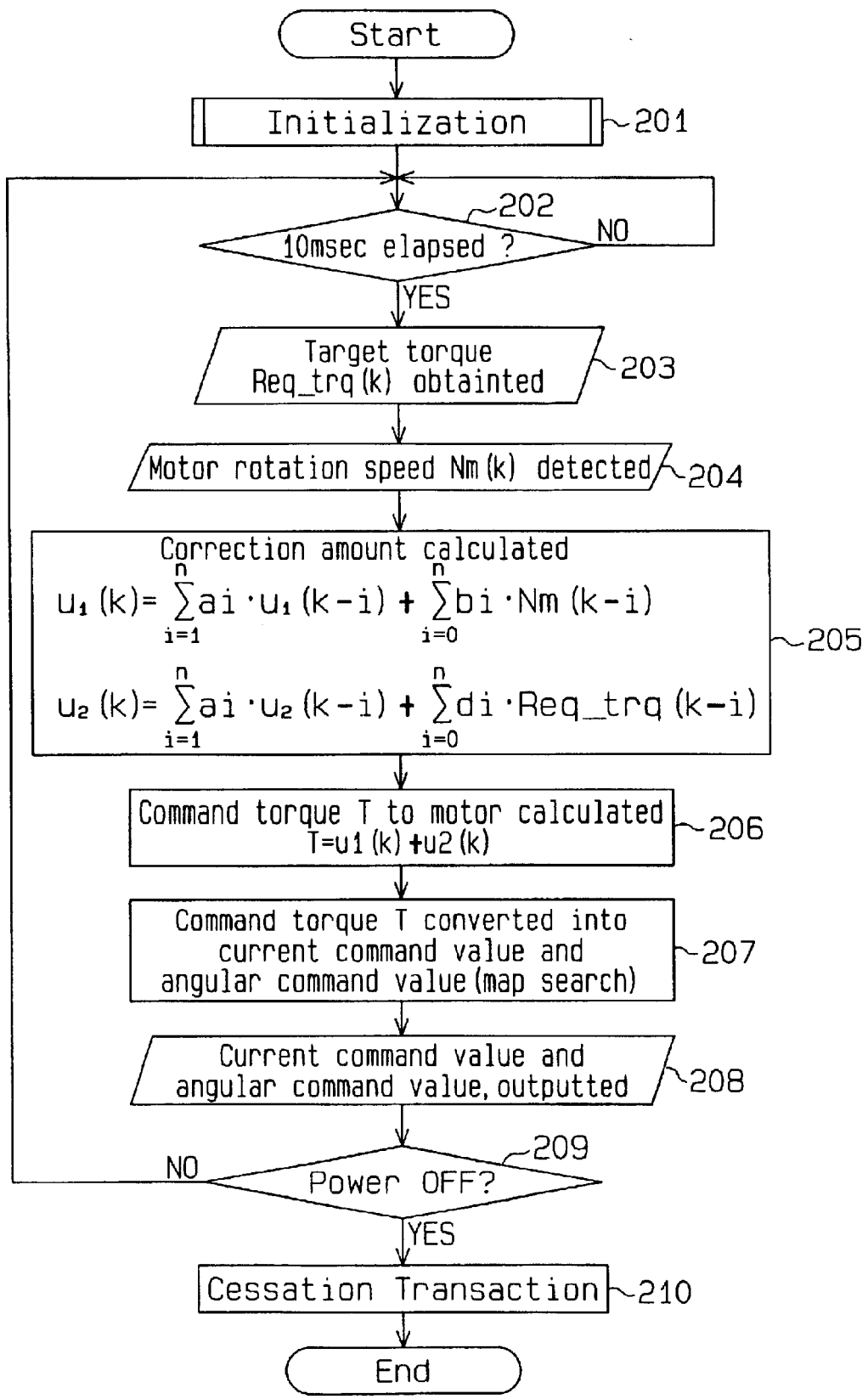
FIG. 19 is a flowchart of a motor control routine according to the embodiment of the present invention.

The memory 18 of the microcomputer 7 memorizes a motor control program shown as a flowchart of FIG. 19. The motor control program will be explained hereinafter.

In Step 201, an initialization is performed. In Step 202, it is judged whether 10 msec. has passed since last control. That is, whether a time for control interval has elapsed is judged for performing the control every 10 msec. In Step 203, the target torque Req_trq (k) is obtained. That is, the throttle opening degree a is read-in and the map M (shown in FIG. 3) is referred based on the throttle opening degree a to obtain the target torque Req_trq (k).

In Step 204, the motor rotation speed Nm (k) is detected. In Step 205, a correction amount calculation transaction is carried out. In other words, the feedback correction amount u1(k) is calculated based on the motor rotation speed Nm and the feedforward correction amount u2(k) is calculated based on the target torque Req_trq using the formula 9 respectively.

In Step 206, the command torque T of the motor is calculated. That is, the command torque T is calculated by the addition of the feedback correction amount u1(k) and the feedforward correction amount u2(k) (i.e., T=u1(k)+u2(k)). In Step 207, the command torque T is converted into the electric current command value I and the angular command value θ to the motor. That is, the microcomputer 7 obtains the electric current command value I and the angular command value θ respectively, referring to individual map (i.e., map MP of FIG. 18) based on three parameters including the command torque T, the motor rotation speed Nm, and the battery electric voltage Vb.

In Step 208, the electric current command value I and the angular command value θ are outputted. That is, the microcomputer 7 commands the electric current command value I and the angular command value θ to the chopper circuit 8. Thus, the chopper circuit 8 performs the PWM control of the switching circuit 10 via the driving circuit 9 at the excitation timing determined from the angular command value θ with the duty value percentage in which the excitation electric current corresponding to the electric current command value I is flowed. Accordingly, the motor coils 31, 32, 33 are sequently energized at a predetermined excitation timing.

In Step 209, it is judged whether the electric power sourse is OFF. The transaction is returned to Step 202 during the electric power source is ON to repeat the transactions of Steps 202–209. When the electric power source is OFF, a cessation transaction is performed in Step 210.

Thus, the target torque Req_trq (k) is determined based on the throttle opening degree α. The command torque T is determined by the correction amounts u1(k), u2(k) determined by the target torque Req_trq (k), the actual motor rotation speed Nm, and the controller K. Then, the energization to the SR motor 3 is performed in accordance with the command torque T.

Figure 20:
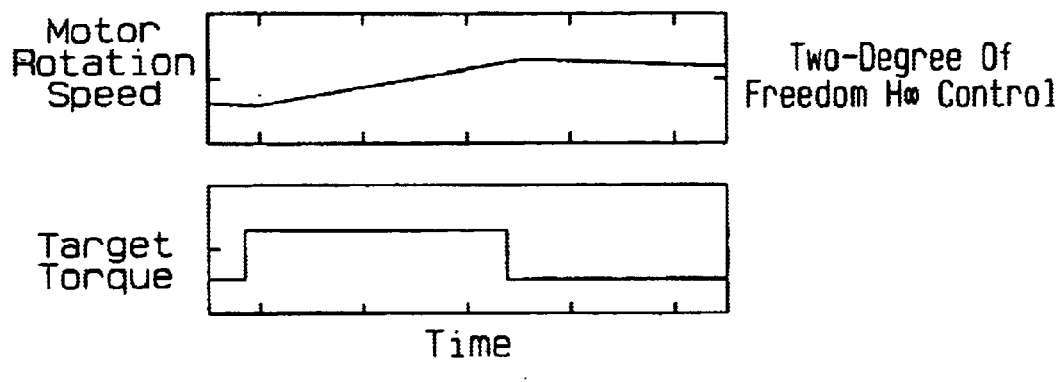
FIG. 20 is a time chart showing the motor rotation speed characteristic during a torque change according to the embodiment of the present invention.
Figure 21:
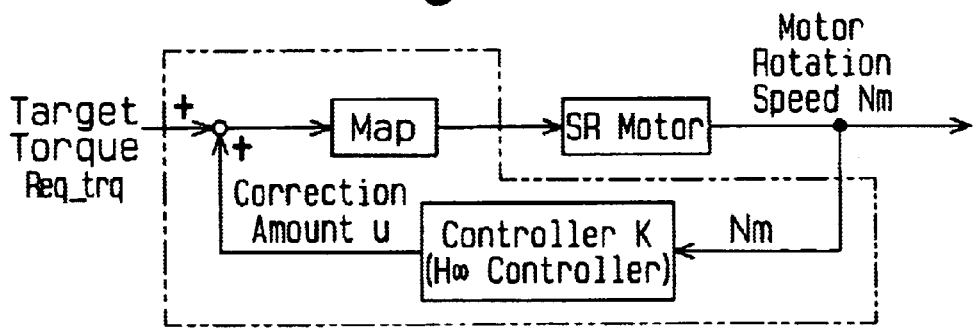
FIG. 21 is a block view showing a known detail of motor control.
Figure 22:
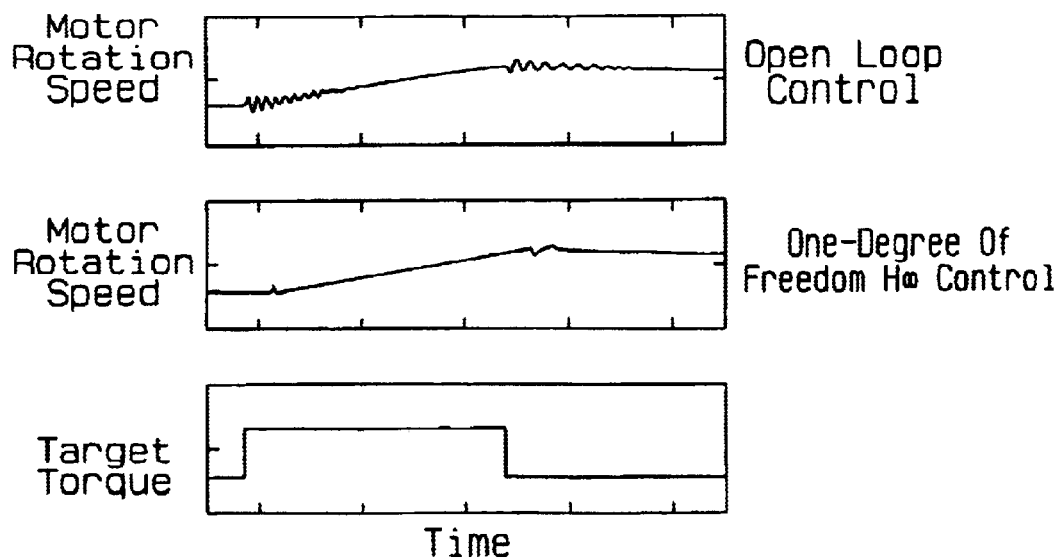
FIG. 22 is a time chart showing the motor rotation characteristic during a torque change according to a known deice.

FIG. 20 shows a time chart for showing the motor rotation speed characteristic when generating the stepped input by suddenly changing the target torque by either stepping on or releasing the throttle pedal 12 according to the SR motor 3 for performing the control. As shown in FIG. 20, the vibration (i.e., resonance) of the motor rotation speed relative to the stepped input is restrained to be approximately zero.

As explained in the foregoing manner, the following effects can be obtained according to the aforementioned embodiment.

According to the foregoing embodiment, the feedback correction amount u1 is obtained based on the detected motor rotation speed Nm and the feedforward correction amount u2 is obtained based on the calculated target torque Req_trq by the controller K. By commanding the torque control to the SR motor 3 based on the feedback correction amount u1 and the feed forward correction amount u2, high robust stability and the tracking performance can be compatible in the control of the SR motor 3.

By obtaining the controller K as the two-degree of freedom of H∞ control problem in the foregoing manner, the compatibility of the high robust stability and the tracking performance can be achieved and thus, the adjustment hour is reduced and the parts (i.e., controller) is standardized.

According to the foregoing embodiment of the control device of the electric motor, the robust stability can be improved relative to the characteristic variation regarding the difference of the driving condition, the difference of the SR motor 3, the difference of the vehicle body 1a (i.e., vehicle type) on which the SR motor 3 is assembled, the torque ripple, the sensor noise, and the steady-state element of the motor rotation speed Nm.

According to the foregoing embodiment of the control device of the electric motor, the acceleration performance of the vehicle and the vibration restrain can be appropriate by optimizing the tracking performance (i.e., vibration reduction and the torque tracking performance).

According to the foregoing embodiment of the control device of the electric motor, the drivability of the electric vehicle 1 can be improved by reducing the longitudinal vibration of the vehicle body 1a by restraining the vibration of the motor rotation speed.

Embodiments of the control device of the electric motor of the present invention is not limited to the forgoing embodiment and can be varied as follows.

Although the controller K corresponds to a digital filter realized on software in the foregoing embodiment, the controller k may be realized with a digital filter of hardware.

At least one of the differences of the driving condition the characteristic variation, the differences of the SR motor 3, the differences of the vehicle body 1a (i.e., vehicle type) on which the SR motor 3 is assembled, the torque ripple, the sensor noise and the steady-state element of the motor rotation speed Nm can be omitted as the characteristic variation.

Although the controller K (s) of the $28^{th}$ term is derived to be $13^{th}$ term in the foregoing embodiment of the present invention, the controller K (s) may be performed with the model reduction to different term. Otherwise, the model reduction transaction may be omitted.

The setting of each weight function and the composition of the generalized plant with each weight function is not limited to the foregoing embodiment and other setting may be applied.

Although the SR motor is applied as the electric motor in the foregoing embodiment, the electric motor is not limited to the SR motor. An alternate current induction motor may be applied as the electric motor.

Although the control device of the electric motor of the present invention is applied to the control of the electric motor of the electric automobile in the foregoing embodiment, the control device of the electric motor of the present invention is not limited to the forgoing embodiment and can be applied to other electric vehicles. In addition, the control device of the electric motor of the present invention can be applied to an electric motor installed for other usages other than the driving power source of the vehicle. Further, the control device of the electric motor of the present invention is applied to the electric motor used in other usage other than the vehicle.

According to the control device of the electric motor of the present invention, high robust stability and the tracking performance can be compatible according to the control of the electric motor.

According to the control device of the electric motor of the present invention, the robust stability can be improved relative to the characteristic variation regarding at least one of the differences of the driving condition, the differences of the electric motor, the differences of the body to be assembled on which the electric motor is assembled, the torque ripple, the sensor noise, and the steady-state element of the motor rotation speed.

According to the control device of the electric motor of the present invention, the feedback correction amount can be obtained based on the detected motor rotation speed and the feedforward correction amount can be obtained based on the calculated target torque. By commanding the torque control to the electric motor based on the feedback correction amount and the feedforward correction amount, high robust stability and the tracking performance can be compatible in the control of the electric motor.

According to the control device of the electric motor of the present invention, the controller is derived by indicating the transfer function of the controller with the generalized plant of two-degree of freedom H∞ control problem in which the robust stability performance relative to the characteristic variation of the electric motor and the follow-up performance of the electric motor from the target torque to the motor rotation speed are independently set respectively. Thus, high robust stability performance and the tracking performance can be compatible by controlling the electric motor with this controller.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device for an electric motor comprising:

an electric motor;

a detection means for detecting a motor rotation speed of the electric motor;

a calculation means for calculating a target torque of the electric motor;

a feedback compensator for obtaining a feedback correction amount based on the detected motor rotation speed;

a feedforward compensator for obtaining a feedforward correction amount based on the calculated target torque; and a control means for commanding a torque control to the electric motor and designed by using H∞ control theory based on the feedback correction amount and the feedforward correction amount.

2. A control device for an electric motor according to claim 1, wherein the control device is designed in consideration of a characteristic variation of the electric motor, wherein further, the characteristic variation corresponds to at least one of differences of driving condition, differences of electric motor type, differences of a body to be assembled on which the electric motor is assembled, a torque ripple, sensor noise, and steady-state element of the motor rotation speed.

3. A designing method of a control device for an electric motor comprising a controller for performing a feedback control based on a detected motor rotation speed and for performing a feedforward control based on a calculated target torque comprising steps of:

determining a transfer function in which a robust stability performance relative to a characteristic variation of the electric motor and a tracking performance of the electric motor from a target torque to a motor rotation speed are individually predetermined; and deriving the controller so that an H∞ norm is minimized.

4. A designing method of a control device for an electric motor according to claim 3, wherein the characteristic variation of the electric motor includes at least one of differences of driving condition, differences of the electric motor, differences of a body to be assembled on which the electric motor is assembled, a torque ripple, sensor noise, and steady-state element of the motor rotation speed.

* * * * *